5831X
J. J. Heintzelman,
Truss.
Patented Feb. 16, 1830.
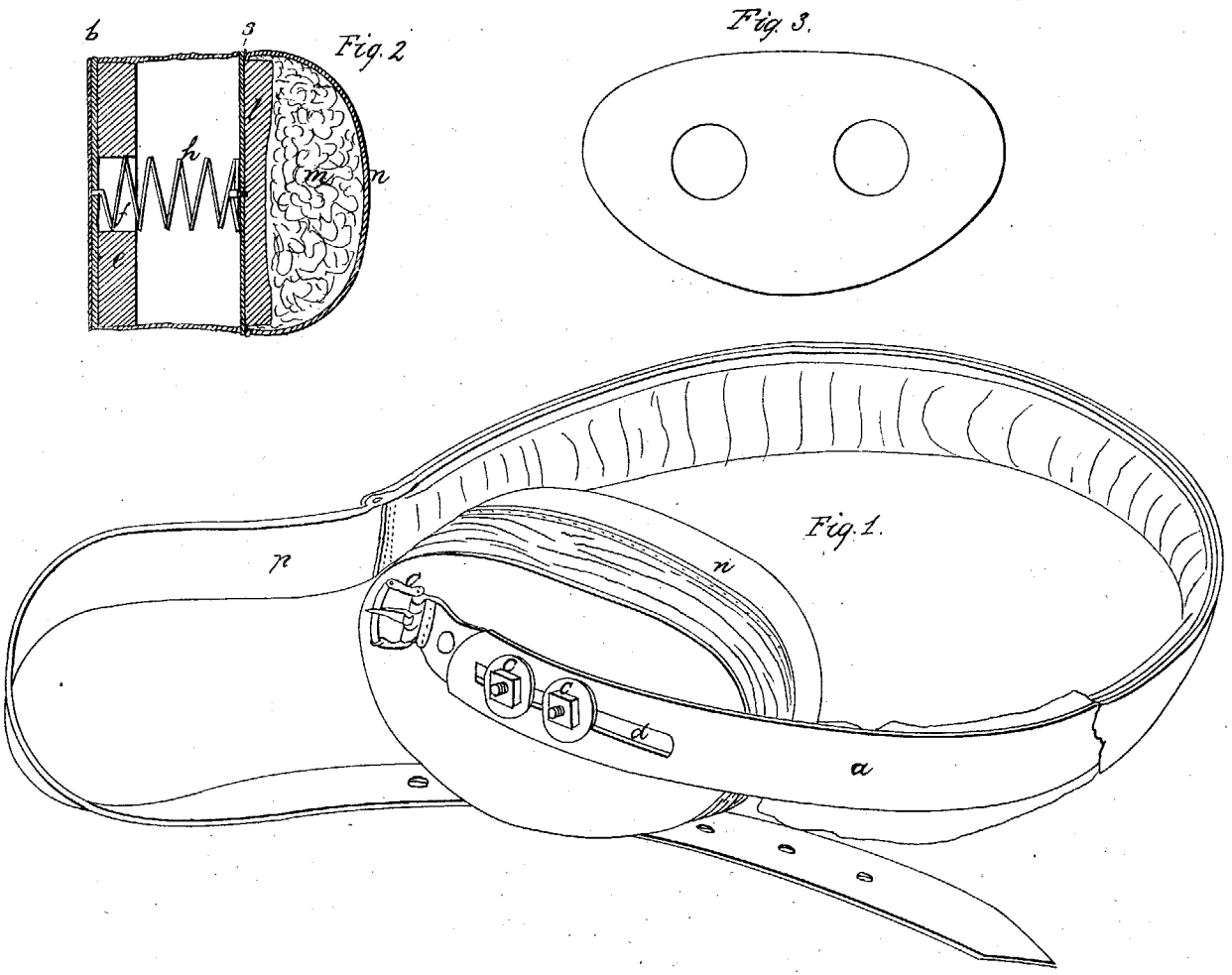
AM. PHOTO-LITHO. CO. N.Y. (OSBORNE'S PROCESS.)

Feb. 16 1830 259

5831X

John S. Heintzelman
Letters Patent

The Schedule referred to in these Letters Patent and making part of
the same containing a description in the words of the said John S.
Heintzelman himself of his improvement in the "Spiral Spring
Truss".

---

The large portion of mankind who are afflicted with this complaint;
the great variety of forms in which it appears; the fatality which re-
sults from improper treatment & the deficiency hitherto experienced for
the want of a good Truss to confine the Omentum or intestines which
are the most moveable viscera and occupy the front & lower part of the
belly within the parietes of the abdomen; are circumstances which com-
bine to render the investigation of Hernia for a radical cure; an instru-
ment to mitigate the distress of those afflicted, by a well adapted Truss
peculiarly interesting. Before I describe my Improvement of the
Spiral Spring Truss I shall concisely state some of the inconveniences
& imperfections of the present construction. They are 1st The one
in present use consists of a circular steel Spring about one inch broad
with a small sheet iron plate rivetted at the extreme end about four
inches in length & about two and a half inches broad in the middle form-
ing part of an oval on the upper & extreme end, on the lower side from
the middle gradually inclining oblique to the place where it is rivet-
ted to the circular Spring already described with two small knobs on
the outside for fastening the strap of leather which is attached to the
covering of the circular Spring, so as to secure it on the body.
2nd On the iron plate above described there is a small convex block
secured by several nails on which there is placed a parcel of wool or
cotton & the whole truss covered with Buckskin or some other kind
of leather with a view of rendering it soft and elastic.
3. Now it must naturally follow that the truss just described
possesses no elasticity besides the careless manner in which the spring is

5831X is frequently prepared paying neither attention nor regard to the temp-
ering of the steel: is frequently allotted to some inexperienced workman
or apprentice, or even the formation of the pad & covering which is frequent-
ly entrusted to some female for a compensation by no means adequate
for the trouble; they are put into the market without inspection nay
scarcely seen by the manufacturer himself. &c. &c. So that the
very construction of the above truss renders it useless possessing no elastici-
ty whatsoever (will at once be admitted by every man of ordinary ca-
pacity) thereby irritating the parts on which it is worn & naturally
endangers the life of him who has had the misfortune of being afflicted
with so distressing & dangerous disease, by not keeping it confined with-
in its proper place but on the contrary by causing irritation of the parts
& the frequent repetitions of protrusion, eventually suffer strangula-
tion & close the distressing scene by death. By my improvement
which I am about now to describe many if not all of the above dangers
& difficulties are obviated which I feel satisfied the most censorious
or inexperienced will admit. 1st The Spring and pad are here
elastic, no iron plates rivetted to a circular spring on a wooden block
nailed thereon, or pad stuffed to a degree, the hardness thereof equal
to the block itself are to be found in the "Spiral Spring Truss". On the
contrary a circular spring the length thereof depends on the size of the per-
son with an opening at one end about one & a half inch long, by which
means it is attached to a steel iron plate about four inches in length
& about two & a half inches broad in the middle forming part of an oval
on the extreme end & upper part: on the lower side from the middle gradu-
ally inclining in an oblique manner to one end of the circular spring
with the opening as described above, by this means the spring is fastened
on the above described plate by two stationary screws passing thro' the
said opening into the plate, should it be at any time necessary to
lengthen or shorten the circular spring it is easily accomplished by
loosening the screws & pushing the circular spring forwards or backwards
as the person may find it necessary & again fastening the screws so
that any person of ordinary judgement is able at once to give it the the requisite length which is of great importance. To the inside of the
small plate as described above there is fastened a flat piece of cork
with two round holes therein to admit the Spiral Springs which I
shall presently describe which confines them in a firm position when
they are loaded with pressure more than ordinary & in no degree impair
the elasticity thereof in the least which has been the great desideratum
hitherto so anxious to obtain. It will easily be perceived from the posi-
tion in which these spiral springs are placed which is in a direct line
from the former described plate & inserted in another tin plate of the
same size and shape which bears immediately on the parts, so that
when the spiral truss is not worn leaving the spring free they natur-
ally force the two plates about one and a half to two inches apart &
contract in ratio as force is applied, being evident, the greater exertion
is made by the person it naturally follows, the greater the action
should be on the parts & so vice versa & which I believe is happily com-
bined in the principles of the spiral spring truss. In relation to the
spiral springs they consist of steel wire of the requisite length to the size
of the Truss made into a spiral form terminating at each end into
the centre, the points turned outwards, the whole being parallel; these
points are inserted into a small hole expressly made in each plate in a
straight line for the reception of the points affixed at the extremity of
each spring as just described, by which means they are kept in their prop-
er places; on the other side of the tin plate facing the body, there is
another piece of cork the size of the tin plate about a quarter of an inch
thick, the centre of which is rather depressed. on this there is placed wool
to the thickness of an inch or more. the whole truss is now carefully
covered with soft buckskin leather forming as it were an even sur-
face over the whole pad; having the edges of the leather around the
pad firmly sewed to the edges of the tin & well secured to the external
plate or covering to which the circular spring is fixed. the whole in ap-
pearance when the spiral springs are at rest, a bellows inflated. on
the back of the pad where the circular spring joins the outside plate
there is a small knob fixed which with a leather strap continuing
[illegible]

S831X from the covering of the other end of the circular spring is buckled on
the body of a moderate tightness which must be drawing calls the
spiral spring into action producing great elasticity & rotary motion,
as the springs are governed altogether by the motion of the body whatso
ever position it is placed in or undue strength imposed on the parts, at
the same time not impairing the mobility of the Truss in the least
degree which has been the deficiency of the former one described.

By this improvement I claim every mode of junction of the Truss
formed on any union of the spiral or other springs possessing elasticity
or rotary motion with a slide in the circular spring for lengthening
or shortening the same together with a buckle & strap for fastening
the same around the body which I find to answer perfectly well.

Witnesses

[illegible] Henry [illegible]

[illegible] [illegible]

John J. Heintzelman

[illegible]